W. G. ENGLE.
STANDING GRAIN THRESHER.
APPLICATION FILED APR. 14, 1913.
1,122,375.
Patented Dec. 29, 1914.
3 SHEETS—SHEET 1.
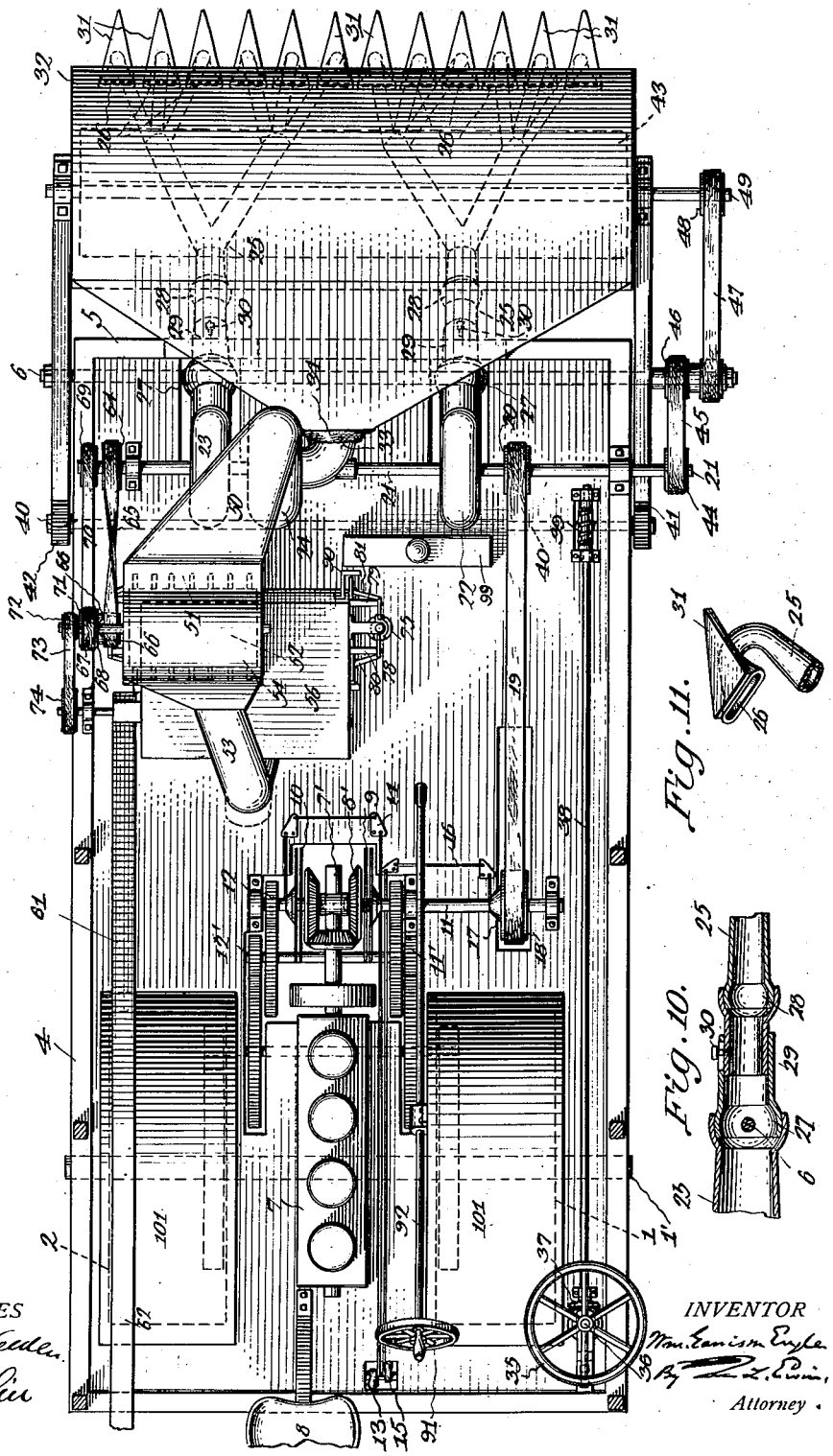
WITNESSES
INVENTOR
Attorney.

W. G. ENGLE.
STANDING GRAIN THRESHER.
APPLICATION FILED APR. 14, 1913.
1,122,375.
Patented Dec. 29, 1914.
3 SHEETS—SHEET 2.
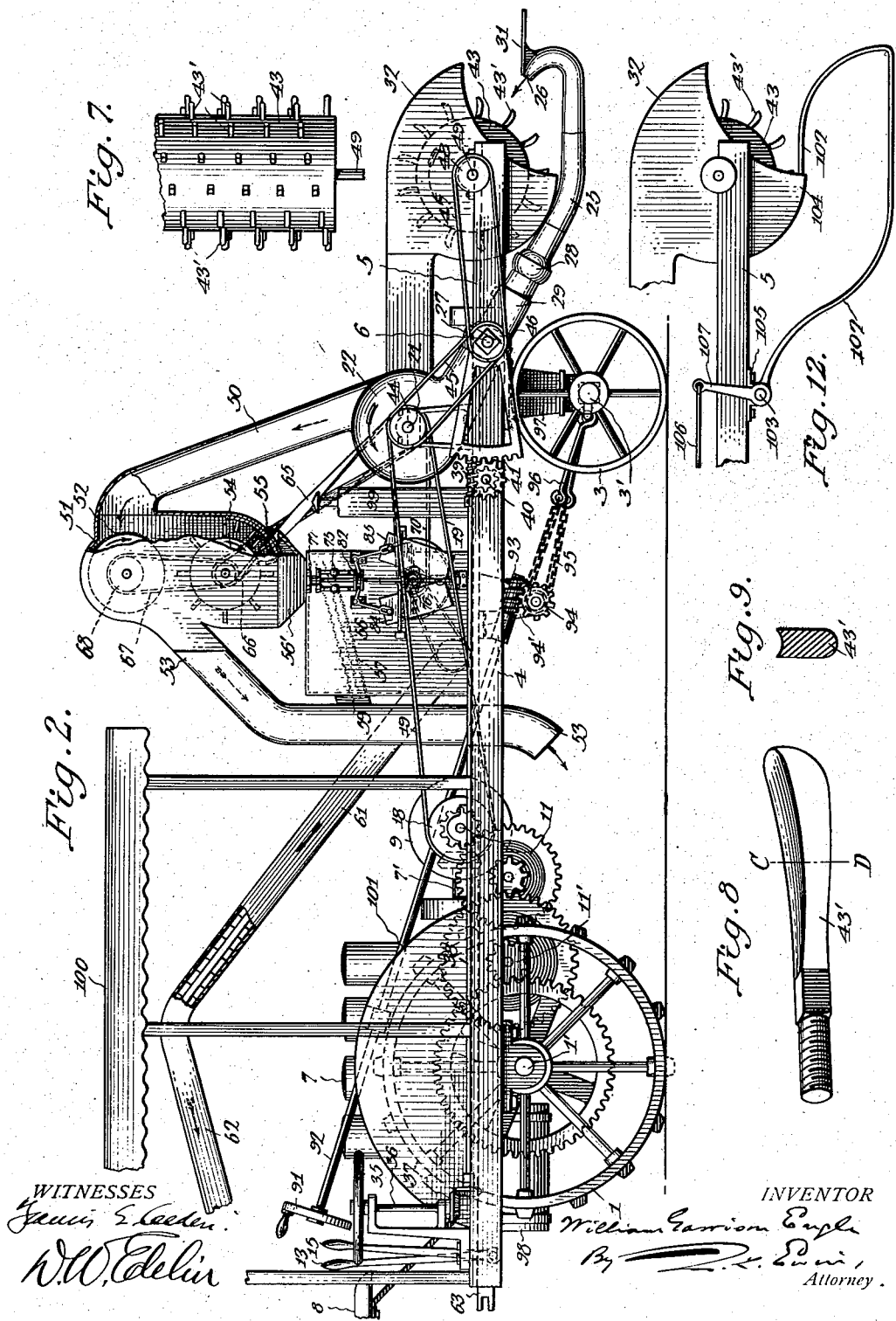
WITNESSES
INVENTOR
William Garrison Engle
By
Attorney.

W. G. ENGLE.
STANDING GRAIN THRESHER.
APPLICATION FILED APR. 14, 1913.
1,122,375.
Patented Dec. 29, 1914.
3 SHEETS—SHEET 3.
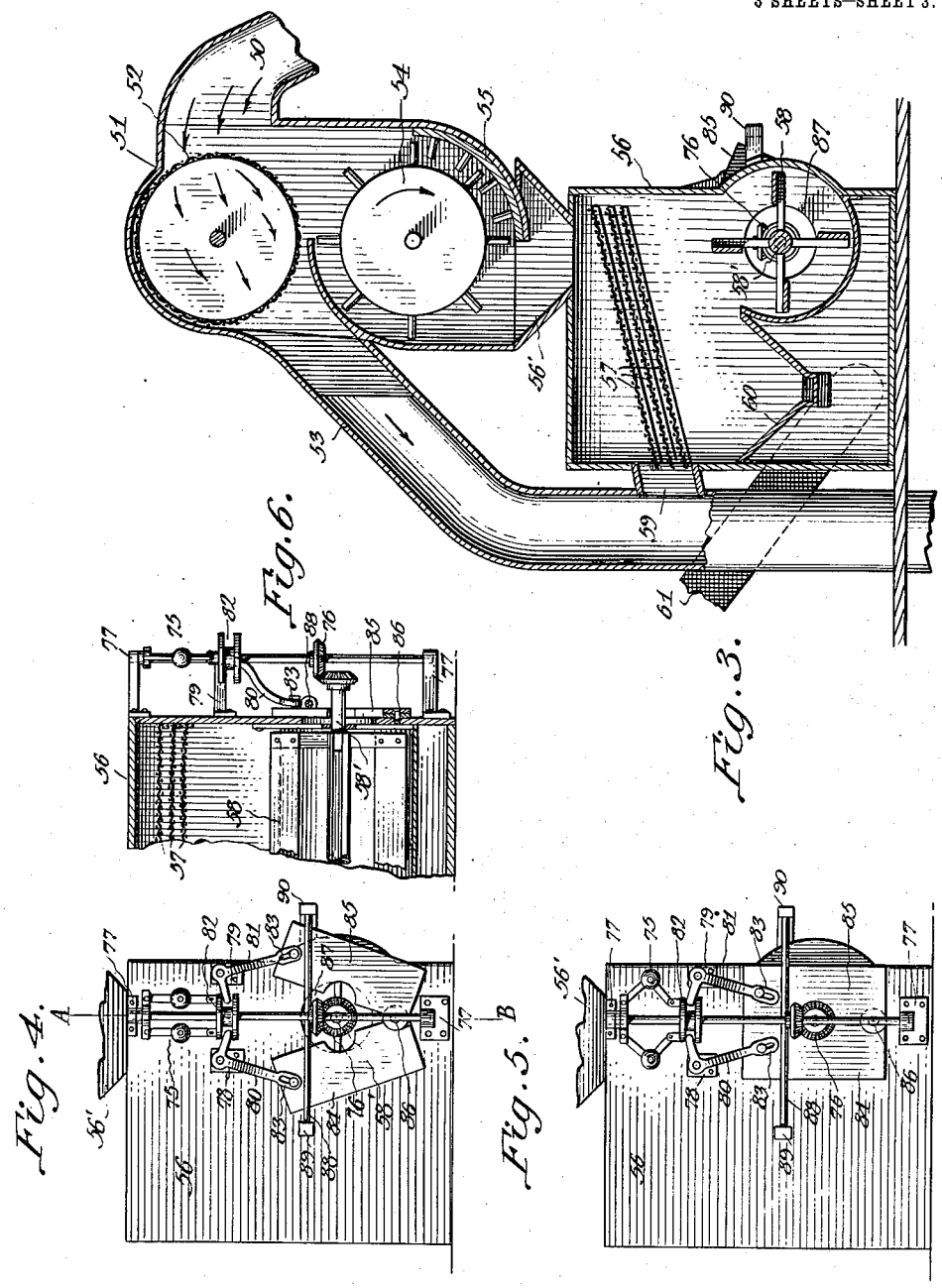
WITNESSES
INVENTOR
William Garrison Engle
By
Attorney.

UNITED STATES PATENT OFFICE.

WILLIAM GARRISON ENGLE, OF ENDERLIN, NORTH DAKOTA, ASSIGNOR OF ONE-TENTH TO J. M. BATES, OF LISBON, NORTH DAKOTA, AND ONE-TENTH TO K. O. SANDUM, OF MINNEAPOLIS, MINNESOTA.

STANDING-GRAIN THRESHER.

1,122,375.  Specification of Letters Patent.  Patented Dec. 29, 1914.

Application filed April 14, 1913. Serial No. 761,073.

*To all whom it may concern:*

Be it known that I, WILLIAM GARRISON ENGLE, a citizen of the United States of America, and a resident of Enderlin, in the State of North Dakota, have invented a new and useful Improvement in Standing-Grain Threshers, of which the following is a specification.

This invention relates to threshing harvesters, and especially to those machines designed to harvest and thresh wheat and like grain from the standing stalks, leaving the straw in the field, and handling only the grain and those heads which do not at once yield to the threshing operation.

The present invention consists in an improved threshing harvester of that type, and in certain novel combinations of parts adapted to be and preferably included as a whole in an improved standing grain thresher, as hereinafter particularly described and claimed.

The leading objects of the present invention are to handle the grain, so to speak, to the largest extent that is practicable by air blasts and suction; to avoid severing the heads to as large an extent as is practicable by stripping the grains from the stalks; to prevent the loss of grain at the point of impact; to effectively separate the grain and heads from the escaping air; and to propel and operate the thresher by one and the same gasolene motor or like internal combustion engine, hereinafter termed the motor.

Other objects will be set forth in the general description which follows.

Three sheets of drawings accompany this specification as part thereof.

Figure 1 is a top view of the improved standing-grain thresher, omitting some of the parts for clearness; Fig. 2 is a side view of the same; Fig. 3 is a sectional side view of a portion of the apparatus on a larger scale; Figs. 4 and 5 are side views of the fanning mill on the same scale as Fig. 3, showing one of its air draft governors at different speeds; Fig. 6 is a fragmentary section on the line A—B, Fig. 4; Fig. 7 is a detail view of the stripping cylinder; Fig. 8 is a perspective view of one of its "spoon-shaped" teeth detached; Fig. 9 represents a cross section on the line C—D, Fig. 8; Fig. 10 represents a longitudinal section through the joints of one of the air-blast tubes; Fig. 11 is a perspective view of one of the air-blast nozzles; and Fig. 12 is a fragmentary side view showing an attachment for lifting fallen grain.

Like reference characters refer to like parts in all the figures.

The improved standing-grain thresher is mounted on wheels 1, 2, and 3, of which the wheels 1 and 2 are preferably and conveniently drivers, and the pair of wheels one of which is shown at 3 are pilot wheels, the axle of which is movable on a central vertical axis for steering the thresher. Upon the axles 1' and 3' of said wheels 1 and 2 and wheels 3 a horizontal main frame 4 is suitably mounted; and to the front end of said main frame 4 a front frame 5 is hinged by suitable means including a transverse hinge rod 6; said main frame carrying the motor, 7, the driver's seat, 8, or its equivalent, and the bulk of the apparatus hereinafter described, including all that part of the same which is not carried by said front frame 5. Power is transmitted from the motor 7, through the motor shaft 7', bevel gearing 8' and clutches 9, 10, to a pair of countershafts, 11, 12, which are in turn connected by trains, 11', 12', of power multiplying spur gearing to the respective drivers 1 and 2, for propelling the thresher forward or backward, under control of a hand lever 13 and connections 14; the latter represented diagrammatically in Fig. 1. From the countershaft 11, through which the thresher is driven forward, power is also transmitted, at will, under the control of a hand lever 15 through connections 16, and a clutch 17, Fig. 1, to clutch controlled belt gearing 18, 19, 20, and therethrough to a transverse fan shaft 21, which carries the rotors of three (or more) fans 22, 23, 24, mounted on said main frame 4 near its front end. From the downwardly and forwardly directed tangential outlet of the casing of each of said fans 22 and 23, an air tube 25 extends forward beneath said front frame 5, its front end being forked, and terminating in several recurved and flattened nozzles 26; the aggregate cross-sectional area of all the nozzles of each group being less than the cross sectional area of the corresponding tube 25 at the fan, so as to increase the force of the blast of air as it issues from the nozzles.

A hollow ball joint, 27, in each of the air tubes 25, axially coincident with the hinge rod 6, provides for raising and lowering the tubes with the front frame 5; a second like joint, 28, renders the nozzle end of the tube independently adjustable to a sufficient extent; and a slip joint 29, Fig. 10, preferably located between the two ball joints, and provided with a set screw and slot, 30, Fig. 10, or equivalent means for fastening this joint, provides for advancing or retracting the nozzles 26.

A superposed divider 31, Figs. 1 and 11, carried by each of the nozzles 26, separates the stalks of the standing grain as the thresher enters it; the spaces between these dividers being sufficient for the passage of the stalks. As the nozzles pass the stalks, the blast of air therethrough blows the grain heads backward, and the air being directed upward as well as backward tends to carry detached grain and heads therewith into the space within an open fronted grain receptacle in the form of a hood, 32, carried by the front frame, 5, and having a central rear outlet neck, 33, Fig. 1, in communication with the inlet of the fan 24, which is a suction fan. A suitable joint, 34, Fig. 1, in said neck 33, renders the same sufficiently flexible and extensible for its accommodation to the depression or elevation of the front of the hood with that of the front frame 5. This adjustment of the thresher to the height of the standing grain is effected by turning a hand wheel 35 near the driver's seat 8, through a short vertical shaft or staff, 36, bevel gears, 37, a longitudinal shaft 38, worm gearing 39, a transverse shaft 40, and sector gearing 41, 42, on both sides of the thresher, connected by said shaft 40. Compare Figs. 1 and 2.

The pressure of the air issuing from the nozzles 26, aided by the suction of the fan 24, and the forward movement of the thresher, brings the heads of the standing grain effectively into contact with the exposed front of a stripping cylinder, 43, within the hood; the nozzles being sufficiently numerous and so shaped as to distribute the blast of air therethrough along the cylinder from end to end. This cylinder rotates counter-clock-wise, that is to say in a direction the reverse of that of the ground wheels of the forwardly moving thresher, and at sufficient speed, and is driven from the fan shaft 21, through belt-gearing 44, 45, 46, 47, 48, Fig. 1, and a shaft 49 on which the pulley 48 and cylinder 43 are fast; the double pulley represented at 46 being loose on the hinge rod 6 at the axis of the swinging movement of the front frame 5.

The periphery of the cylinder 43 is solid, and carries in spiral rows a sufficient number of protruding spoon-shaped "teeth" 43', one of which is shown detached at Figs. 8 and 9. As the cylinder 43 rotates, the teeth 43' travel upwardly at its exposed front, as indicated by the dotted arrow at 43 in Fig. 2. The concave face of each of these teeth is directed upward at the front of the cylinder, and strikes the grain heads from beneath, catching detached grains and throwing them into the interior of the hood 32, where they are caught, together with the detached grain heads, by the suction of said fan 24, and saved.

The tangential outlet of the fan 24 is connected by an ascending air trunk, 50, with the interior of a casing 51, at the top of the thresher, within which a peripherally screened separating cylinder, 52, Fig. 3, rotates so as to oppose successive clean portions of its peripheral screen to the mingled air, grain heads, grain and chaff blown against it by the fans 22, 23 and 24. From a substantially opposite point an escape tube, 53, extends downward to a point beneath the main frame 4, and the air passing through the screen of the cylinder 52 is discharged beneath the thresher through this tube.

Free grain, chaff and unthreshed heads drop from the periphery of the separating cylinder 52 upon a subjacent threshing cylinder 54 within the same casing, or into its concave 55; both of these being suitably toothed, and serving to complete the threshing operation. From the concave 55 the free grain and chaff drop into the hopper 56' of a subjacent fanning mill 56, and upon its screen or screens 57, through which air is blown by a fan 58. An outlet, 59, for air and chaff connects the interior of the fanning mill 56 with that of the escape tube 53. The separated grain drops into a hopper 60, which discharges into the lower end of an elevator, 61, and the latter discharges through a conveying tube 62, into a "tank" (not shown) attached to the rear of the thresher by a suitable coupling, 63, Fig. 2.

Motion for the several operations last described is transmitted from the fan shaft 21 through belt gearing 64, 65, 66 to the threshing cylinder 54, and from the shaft of the latter through belt gearing 66, 67, 68 to the separating cylinder 52. Also from said fan shaft 21, through belt gearing 69, 70, 71, to the fan shaft of the fanning mill 56, and from this shaft through belt gearing 72, 73, 74, to the moving member of the elevator 61. All the continuously moving parts of the threshing, separating and conveying elements of the improved thresher may thus be driven by way of said fan shaft 21 from the motor 7, and under its direct control.

To regulate the operation of the fanning mill 56 according to the speed of the thresher, a centrifugal governor, 75, Figs. 4–6, is mounted at each side of the mill above its fan shaft 58', and connected with the latter by bevel gears, 76, so as to rotate in unison therewith. The vertical governor shaft has fixed supports 77 projecting from the casing of the fanning mill, and upon a pair of fixed supports, 78, 79, adjacent thereto, a pair of bell crank levers 80, 81 are fulcrumed. The shorter arms of these levers engage with the grooved slide 82 of the governor, and their long arms have slotted connections 83 with the respective movable members, 84, 85, of a bisected air-intake damper, having a fixed hinge support 86 at bottom, and adapted to open more or less fully as required the adjoining air intake 87 of the mill, as illustrated by Figs. 4 and 5. Said movable members 84, 85, are kept in contact with the apertured side of the mill casing by a guide bar 88 parallel therewith, having supports, 89, 90, attached to said casing.

The thresher as shown, is steered by turning a hand wheel 91, Fig. 2, near the driver's seat 8, through a shaft, 92, worm gearing, 93, a horizontal winch shaft, 94, mounted in hangers, 94', beneath the main frame 4, chains 95 wound upon said winch shaft, and lever arms or link rods 96, suitably connected with the pilot wheel axle 3'; this axle being movable around the vertical axis of a central pedestal 97. As accessories to the motor 7, a liquid fuel reservoir suspended beneath the main frame 4 is represented at 98, Fig. 2, and a radiator or cooler at 99. A canopy above the motor and driver's seat is represented at 100 in Fig. 2 and "mud guards" at 101.

For adapting the thresher to operate in fallen grain an attachment is represented by Fig. 12 (Sheet 2), the same comprising a sufficient number of resilient wire fingers 102, projecting downward and forward from a rock shaft 103, and having recurved front ends which lead up to the plane of the revolving teeth of the stripping cylinder 43, and may be attached at their extremities to a convenient support 104 beneath the front frame 5; said rock-shaft 103 being mounted in bearings 105 attached to the bottom of the front frame 5 and operated from the driver's seat 8 through a cord or wire 106 and a lever arm 107, to lift the fingers to clear obstructions.

It will be obvious that sprocket gearing, or other transmission means, may be substituted for the spur gearing and belt gearing hereinbefore described; and other like modifications will suggest themselves to those skilled in the art.

Having thus described said improvement, I claim as my invention and desire to patent under this specification:

1. A standing grain thresher having, in combination with a motor and connections including a transverse fan shaft, rotary blowing fans the rotors of which are carried by said shaft and the tangential outlets of which project forward at the bottom of the fan casing; air tubes, in communication with said outlets extending forward therefrom and terminating in upwardly and rearwardly projecting nozzles at the front of the thresher, spaced apart for the passage of the grain stalks between them; and a rotary stripping cylinder mounted immediately behind said nozzles, and having the same direction of rotation as said fan rotors.

2. A standing grain thresher having, in combination with a motor and connections, rotary blowing fans the tangential outlets of which project forward at the bottom of the fan casing; air tubes, in communication with said outlets, extending forward therefrom, and terminating in upwardly and rearwardly projecting nozzles at the front of the thresher, provided severally with forwardly projecting dividers constructed to enter the standing grain and spaced apart for the passage of the grain stalks between the nozzles and a rotary stripping cylinder the front of which is exposed immediately behind said nozzles.

3. A standing grain thresher having, in combination with a motor and connections, rotary blowing fans the tangential outlets of which project forward at the bottom of the fan casing; air tubes in communication with said outlets, extending forward therefrom, and terminating in upwardly and rearwardly projecting nozzles at the front of the thresher; the extremities of said nozzles being flattened horizontally and provided severally with forwardly projecting dividers corresponding in maximum width with said flattened extremities and spaced apart for the passage of the grain stalks between the nozzles and a rotary stripping cylinder having protruding stripping teeth which travel upward at the front of the cylinder immediately behind said nozzles.

4. A standing grain thresher having, in combination with a motor and connections, rotary blowing fans the tangential outlets of which are at the bottom of the fan casing, a transverse rotary shaft common to the rotors of said fans, air tubes in communication with said outlets severally, a main frame supporting said motor and fans, and a hinged front frame beneath which said air tubes extend forward to the front of the thresher; said front frame being hinged to said main frame by a transverse hinge rod, and said air tubes having hollow ball joints through which said hinge rod extends, and terminating in upwardly and rearwardly projecting nozzles.

5. A standing grain thresher having, in combination with a motor and connections, rotary blowing fans the tangential outlets of which are at the bottom of the fan casing, a transverse rotary shaft common to the rotors of said fans, air tubes in communication with said outlets severally, a main frame supporting said motor and fans, and a hinged front frame beneath which said air tubes extend forward to the front of the thresher; said front frame being hinged to said main frame by a transverse hinge rod, and each of said air tubes having a pair of hollow ball joints through the first of which said hinge rod extends, and terminating in upwardly and rearwardly projecting nozzles.

6. A standing grain thresher having, in combination with a motor and connections, rotary blowing fans the tangential outlets of which are at the bottom of the fan casing, air tubes communicating with said outlets severally, a main frame supporting said motor and fans, a hinged front frame beneath which said air tubes extend forward to the front of the thresher, an open-fronted hood carried by said front frame and forming a grain receptacle, said air tubes being articulated at the hinge axis of said front frame, and terminating in nozzles directed toward said open front of the hood.

7. A standing grain thresher having, in combination with a motor and connections, rotary blowing fans the tangential outlets of which are at the bottom of the fan casing, air tubes communicating with said outlets severally, a main frame supporting said motor and fans, a hinged front frame beneath which said air tubes extend forward to the front of the thresher, an open-fronted hood carried by said front frame and forming a grain receptacle; said air tubes being provided with means for an endwise adjustment of each, and terminating in nozzles directed toward said open front of the hood.

8. A standing grain thresher having, in combination with a motor and connections, rotary blowing fans the tangential outlets of which are at the bottom of the fan casing, air tubes communicating with said outlets severally, a main frame supporting said motor and fans, a hinged front frame beneath which said air tubes extend forward to the front of the thresher, an open-fronted hood carried by said front frame and forming a grain receptacle; said air tubes terminating in nozzles directed toward said open front of the hood, and each tube having a plurality of hollow ball joints one of which is located at the hinge axis of said front frame.

9. A standing grain thresher having, in combination with a motor and connections, rotary blowing fans the tangential outlets of which are at the bottom of the fan casing, air tubes communicating with said outlets severally, a main frame supporting said motor and fans, a hinged front frame beneath which said air tubes extend forward to the front of the thresher, an open-fronted hood carried by said front frame and forming a grain receptacle; said air tubes terminating in nozzles directed toward said open front of the hood, and each tube having a pair of hollow ball joints one of which is located at the hinge axis of said front frame, and a lengthening and shortening joint between said ball joints.

10. A standing grain thresher having, in combination with a motor and connections, rotary blowing fans the tangential outlets of which are suitably directed, a tapered and forked air tube in communication with each of said outlets, extending forward therefrom, and terminating in upwardly and rearwardly directed nozzles the aggregate cross-sectional area of which is less than that of the fan outlet through which they are supplied with air.

11. A standing grain thresher having, in combination with a motor and connections, rotary blowing fans the tangential outlets of which are suitably directed, a tapered and forked air tube in communication with each of said outlets, extending forward therefrom, and terminating in upwardly and rearwardly directed and horizontally flattened nozzles the aggregate cross-sectional area of which is less than that of the fan outlet through which they are supplied with air.

12. A standing grain thresher having, in combination with a motor and connections, a rotary stripping cylinder the front of which is exposed at the front of the thresher and having a solid periphery provided with protruding spoon-shaped teeth—said teeth which travel upwardly at said front of the cylinder having concave faces directed upward at the front of the cylinder, and being adapted to strip the grain from the standing stalks.

13. A standing grain thresher having, in combination with a motor and connections, a rotary stripping cylinder the front of which is exposed at the front of the thresher and having a solid periphery provided with protruding spoon-shaped teeth which travel upwardly at said front of the cylinder said teeth having concave faces directed upward at the front of the cylinder, and being adapted to strip the grain from the standing stalks, and an open-fronted hood inclosing said cylinder and forming a grain receptacle.

14. A standing grain thresher having, in combination with a motor and connections, a rotary stripping cylinder the front of which is exposed at the front of the thresher and having a solid periphery provided with protruding spoon-shaped teeth which travel upwardly at said front of the cylinder said teeth having concave faces directed upward at the front of the cylinder, and being adapted to strip the grain from the standing stalks, an open-fronted hood inclosing said cylinder, blowing fans, and tubes leading from the outlets of said fans and terminating in nozzles directed toward the open front of said hood, said hood forming a grain receptacle into which the grain is blown by said fans and thrown by said cylinder.

15. A standing grain thresher having, in combination with a motor and connections, a rotary stripping cylinder the front of which is exposed at the front of the thresher and having a solid periphery provided with protruding spoon-shaped teeth which travel upwardly at said front of the cylinder said teeth having concave faces directed upward at the front of the cylinder, and being adapted to strip the grain from the standing stalks, an open-fronted hood inclosing said cylinder and having a central rear outlet, a suction fan the intake of which communicates with said outlet, and grain separating apparatus in communication with the outlet of said fan.

16. A standing grain thresher having, in combination with a motor and connections, means for removing the grain from the stalks including blowing fans, tubes leading therefrom and terminating in rearwardly directed nozzles, an open-fronted hood into which said nozzles are directed, having a central outlet, a suction fan in communication with said outlet, an ascending air trunk in communication with the outlet of said suction fan, a separating cylinder having a peripheral screen against which said trunk discharges, a casing for said cylinder having an air escape opening, substantially opposite the outlet of said trunk, and subjacent threshing and separating means into which the arrested grain heads and grain drop from said screen.

17. A standing grain thresher, having, in combination with a motor and connections, means for stripping the grains from the standing stalks, a receptacle into which the stripped grains together with the accompanying chaff and detached heads are thrown by said stripping means, means for producing and directing an air current which receives and carries with it said grains, chaff and heads, a movable separating screen against which said grains, chaff and heads are thrown by said air current, and means for moving said screen to expose fresh screen portions and to release the grains, chaff and heads from air pressure.

18. A standing grain thresher, having, in combination with a motor and connections, means for stripping the grains from the standing stalks, a receptacle into which the stripped grains together with the accompanying chaff and detached heads are thrown by said stripping means, means for producing and directing an air current which receives and carries with it said grains, chaff and heads, a movable separating screen against which said grains, chaff and heads are thrown by said air current, means for moving said screen to expose fresh screen portions and to release the grains, chaff and heads from air pressure, and an air escape into which the air of said air current passes after passing through said screen.

19. A standing grain thresher having, in combination with a motor and connections, means for stripping the grain from the standing stalks, a receptacle into which the stripped heads are thrown by said stripping means, means for producing and directing an air current which receives and carries with it said grains, chaff and heads, a movable separating screen against which said grains, chaff and heads are thrown by said air current, means for moving said screen to expose fresh screen portions and to release the grains, chaff and heads from air pressure, and an escape tube for the air of said air current, discharging beneath the machine.

20. A standing grain thresher having, in combination with a motor and connections, means for stripping the grains from the standing stalks, a receptacle into which the stripped grains together with the accompanying chaff and detached heads are thrown by said stripping means, means for producing and directing an air current which receives and carries with it said grains, chaff and heads, a rotary separating cylinder having a peripheral screen against which said air current is directed at one side of the cylinder, an air escape at the opposite side of said cylinder, and means for rotating said cylinder to release the arrested grains, chaff and heads and to expose fresh screen portions.

21. A standing grain thresher having, in combination with a motor and connections, means for stripping the grains from the standing stalks, a receptacle into which the stripped grains together with the accompanying chaff and detached heads are thrown by said stripping means, means for producing and directing an air current which receives and carries with it said grains, chaff and heads, a rotary separating cylinder having a peripheral screen against which said air current is directed at one side of the cylinder, an air escape at the opposite side of said cylinder, and means for continuously rotating said cylinder to release the arrested grain, chaff and heads and to expose fresh screen portions.

22. A standing grain thresher having, in combination with a motor and connections, means for removing the grain from the standing stalks including blowing fans, an open-fronted hood into which the removed grains together with the accompanying chaff and detached heads are blown, the same having a central outlet, and separating means in communication with said outlet.

23. A standing grain thresher having, in combination with a motor and connections, means for removing the grain from the standing stalks including blowing fans, an open-fronted hood into which the removed grains together with the accompanying chaff and detached heads are blown, the same having a central outlet, and separating means in communication with said outlet, including a rotary air separating cylinder having a peripheral screen successive portions of which are exposed to the current flowing through said outlet.

24. A standing grain thresher having, in combination with a motor and connections, means for removing the grain from the standing stalks including blowing fans, an open-fronted hood into which the removed grains together with the accompanying chaff and detached heads are blown, the same having a central outlet, and separating means in communication with said outlet, including a rotary air separating cylinder having a peripheral screen, successive portions of which are exposed to the current flowing through said outlet, a casing for said cylinder within which said grains, chaff and heads are thrown against said screen at one side thereof by the air current, and an air-escape in communication with the interior of said casing at an opposite point.

25. A standing grain thresher having, in combination with a motor and connections, means for removing grain from the standing stalks including blowing fans, an open-fronted hood into which the removed grains together with the accompanying chaff and detached heads are blown, the same having a central outlet; and separating means, in communication with said outlet, including a rotary air-separating cylinder having a peripheral screen against which at one side thereof said grains, chaff and heads are thrown by the air current, an air escape at an opposite point, a subjacent conduit for the grains, chaff and heads, and a secondary threshing cylinder and concave which receive the grains, chaff and heads from said conduit.

26. A standing grain thresher having, in combination with a motor and connections, means for removing grains from the standing stalks including blowing fans, an open-fronted hood into which the removed grains together with the accompanying chaff and detached heads are blown, the same having a central outlet; and separating means, in communication with said outlet, including a rotary air-separating cylinder having a peripheral screen against which at one side thereof said grains, chaff and heads are thrown by the air current, an air escape at an opposite point, a subjacent conduit for the grains, chaff and heads, a secondary threshing cylinder and concave which receive the grains, chaff and heads from said conduit, and a subjacent fanning mill which receives the grains and chaff from said threshing cylinder and concave.

27. A standing grain thresher having, in combination with a motor and connections, means for removing the grain from the stalks including blowing fans, tubes leading therefrom and terminating in rearwardly directed nozzles, an open-fronted hood into which said nozzles are directed, having a central outlet, a suction fan in communication with said outlet, an ascending air trunk in communication with the outlet of said suction fan, a separating cylinder having a peripheral screen against which said trunk discharges, a casing for said cylinder having an air-escape opening substantially opposite the outlet of said trunk, an air-escape tube extending downward from said opening and discharging beneath the thresher, a threshing cylinder and concave upon which grain heads drop from said screen, and a subjacent fanning mill the chaff outlet of which communicates with said air escape tube.

28. A standing grain thresher having, in combination with a motor and connections, means for removing the grain from the stalks including blowing fans, tubes leading therefrom and terminating in rearwardly directed nozzles, an open-fronted hood into which said nozzles are directed, having a central outlet, a suction fan in communication with said outlet, an ascending air trunk in communication with the outlet of said suction fan, a separating cylinder having a peripheral screen against which said trunk discharges, a casing for said cylinder having an air-escape opening substantially opposite the outlet of said trunk, a threshing cylinder and concave upon which grain heads drop from said screen, a subjacent fanning mill, and governor-controlled means for automatically regulating the admission of air to said fanning mill.

29. A standing grain thresher having, in combination with a wheel-supported main frame, a motor and its appurtenances carried by said frame at its rear end, means for transmitting power from said motor including a transverse fan shaft near the front end of said frame, fans the rotors of which are carried by said shaft, air tubes in communication with the outlets of some of said fans terminating in rearwardly blowing nozzles, an open-fronted hood supported at the front of the thresher and into which said nozzles are directed, a stripping cylinder rotating within said hood, an ascending air trunk in communication with the interior of said hood through the medium of the casing of another of said fans which is a suction fan, grain separating means including a rotary cylinder having a peripheral screen against which said trunk discharges, and means for saving the separated grain.

30. A standing grain thresher having, in combination with a wheel-supported main frame, a motor and its appurtenances carried by said frame at its rear end, means for transmitting power from said motor including a transverse fan shaft near the front end of said frame, fans the rotors of which are carried by said shaft, air tubes in communication with the outlets of some of said fans terminating in rearwardly blowing nozzles, an open-fronted hood supported at the front of the thresher and into which said nozzles are directed, a stripping cylinder rotating within said hood, an ascending air trunk in communication with the interior of said hood through the medium of the casing of another of said fans which is a suction fan, an elevated and suitably incased rotary cylinder having a peripheral screen against which said trunk discharges, a subjacent threshing cylinder and its appurtenances for completing the threshing operation, and means for completing the separating and grain saving operations; the rotatable members of all this apparatus being driven through the medium of said fan shaft.

31. A standing grain thresher having, in combination with a wheel-supported main frame, a motor and its appurtenances carried by said frame at its rear end, means for transmitting power from said motor including a transverse fan shaft near the front end of said frame, fans the rotors of which are carried by said shaft, air tubes in communication with the outlets of some of said fans terminating in rearwardly blowing nozzles, an open-fronted hood supported at the front of the thresher and into which said nozzles are directed, a stripping cylinder rotating within said hood, an ascending air trunk in communication with the interior of said hood through the medium of the casing of another of said fans which is a suction fan, an elevated and suitably incased rotary cylinder having a peripheral screen against which said trunk discharges, a subjacent threshing cylinder and its appurtenances for completing the threshing operation, a fanning mill provided with governor-operated means for regulating the admission of air thereto, a grain elevator in communication with the grain discharge of said fanning mill, and grain-saving means into which said elevator discharges; the rotatable members of all this apparatus being driven through the medium of said fan shaft.

32. A standing grain thresher having, in combination with a wheel-supported main frame; a front frame hinged thereto by suitable means including a transverse hinge rod; means carried by said front frame for removing the grain heads and free grain from the standing stalks, including an open-fronted hood having a central rear outlet, and a stripping cylinder rotating within said hood; blowing fans carried by said main frame; adjustable air tubes leading from the outlets of said fans beneath said front frame, and terminating in nozzles directed toward the open front of said hood; a suction fan in communication with said hood outlet; an ascending air trunk leading from the outlet of said suction fan; a suitably incased rotary separating cylinder having a peripheral screen against which said trunk discharges; subjacent apparatus carried by said main frame for completing the threshing, separating and grain-saving operations; a motor, common to all, carried by said main frame; and means for transmitting power from said motor to said stripping cylinder and to said separating cylinder and the rotatable members of said subjacent apparatus, including a double pulley supported by said hinge rod.

33. A standing grain thresher having, in combination with a wheel-supported main frame; a front frame hinged thereto by suitable means including a transverse hinge rod; means carried by said front frame for removing the grain heads and free grain from the standing stalks, including an open-fronted hood having a central rear outlet, and a stripping cylinder rotating within said hood; blowing fans carried by said main frame; adjustable air tubes leading from the outlets of said fans beneath said front frame, and terminating in nozzles directed toward the open front of said hood; a suction fan in communication with said hood outlet; an ascending air trunk leading from the outlet of said suction fan; a suitably incased rotary separating cylinder having a peripheral screen against which said trunk discharges; subjacent secondary threshing means; a fanning mill into which said secondary threshing means discharges; a grain elevator in communication with the grain outlet of said fanning mill; grain saving devices into which said elevator discharges; a tube, in communication with the interior of the casings of said separating cylinder and fanning mill, through which wind and chaff are discharged beneath the thresher; a motor, common to all, carried by said main frame; and means for transmitting power from said motor including a double pulley supported by said hinge rod.

34. A standing grain thresher having, in combination with a wheel-supported main frame; a front frame hinged thereto by suitable means including a transverse hinge rod; means carried by said front frame for removing the grain heads and free grain from the standing stalks, including an open-fronted hood having a central rear outlet, and a stripping cylinder rotating within said hood; blowing fans carried by said main frame; adjustable air tubes leading from the outlets of said fans beneath said front frame, and terminating in nozzles directed toward the open front of said hood; a suction fan in communication with said hood outlet; an ascending air trunk leading from the outlet of said suction fan; a suitably incased rotary separating cylinder, having a peripheral screen against which said trunk discharges; subjacent apparatus carried by said main frame for completing the threshing, separating and grain-saving operations; a motor, common to all, carried by said main frame; and belt-gearing devices for transmitting rotary motion from said motor, including a transverse fan shaft common to the rotors of said fans, and a double pulley supported by said hinge rod.

35. A self-propelling standing-grain thresher having, in combination with ground wheels, a main frame mounted on the axles of said wheels; a front frame hinged to said main frame; a motor, common to all, supported by said main frame; means for removing grain heads and free grain from the standing stalks, carried by said front frame, and including an open-fronted hood having a central rear outlet, and a stripping cylinder rotating within said hood; blowing fans supported by said main frame; adjustable air tubes, leading from the outlets of said fans, and terminating in nozzles directed toward the open front of said hood; a suction fan in communication with said hood outlet; an ascending air trunk leading from the outlet of said suction fan; apparatus for completing the threshing operation, and for separating and saving the grain, into which said air trunk discharges; a tube, in communication with the interiors of said apparatus, through which wind and chaff are discharged beneath the thresher; and means for transmitting power from said motor for propelling the thresher and for operating the same, respectively; substantially as hereinbefore specified.

WILLIAM GARRISON ENGLE.

Witnesses:
  FRED UNDERWOOD,
  F. VOORHIES.